US012638564B2

(12) United States Patent
Keller et al.

(10) Patent No.: US 12,638,564 B2
(45) Date of Patent: May 26, 2026

(54) WAVEFRONT CORRECTION FOR AERODYNAMIC AND ATMOSPHERIC EFFECTS TO AN OPTICAL SENSOR ON A HIGH-SPEED FLIGHT VEHICLE

(71) Applicant: Raytheon Company, Arlington, VA (US)

(72) Inventors: Sean D. Keller, Tucson, AZ (US); David J. Knapp, Tucson, AZ (US); Jon E. Leigh, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 953 days.

(21) Appl. No.: 17/725,872

(22) Filed: Apr. 21, 2022

(65) Prior Publication Data

US 2023/0101430 A1 Mar. 30, 2023

Related U.S. Application Data

(60) Provisional application No. 63/248,623, filed on Sep. 27, 2021.

(51) Int. Cl.
*G01S 7/497* (2006.01)
*F41G 7/22* (2006.01)
(Continued)

(52) U.S. Cl.
CPC ............ *G01S 7/497* (2013.01); *F41G 7/2246* (2013.01); *F41G 7/2293* (2013.01); (Continued)

(58) Field of Classification Search
CPC ...... G01S 7/497; G01S 7/4811; F41G 7/2246; F41G 7/2293; G02B 5/09; G02B 7/185; G02B 26/06; G02B 27/0068
See application file for complete search history.

(56) References Cited

U.S. PATENT DOCUMENTS 5,404,375 A 4/1995 Kroeger et al.
5,854,702 A 12/1998 Ishikawa et al.
(Continued)

FOREIGN PATENT DOCUMENTS

AU 2005213216 A1 8/2005
AU 2005213231 A1 8/2005
(Continued)

OTHER PUBLICATIONS

U.S. Appl. No. 17/007,917, filed Aug. 31, 2020, Electronically Steered Inter-Satellite Optical Communications System With Micro-Electromechanical (MEM) Micromirror Array (MMA).
(Continued)

*Primary Examiner* — Jennifer D Bennett
(74) *Attorney, Agent, or Firm* — Schwegman Lundberg & Woessner, P.A.

(57) ABSTRACT

A system and method for measurement and correction of aero-optical and aero-thermal effects to an EO/IR sensor's window/dome on a supersonic flight-vehicle. Range-gating of laser pulses measures and separates aerodynamic and atmospheric effects. Separate control algorithms and control loops at different update rates both simplifies the control algorithms and improves overall performance. The use of a MEMS MMA having tip/tilt/piston capabilities as the deformable mirror to provide wavefront correction enhances overall performance. The corrected laser pulses may also be used to actively illuminate a target to provide both active and passive detection.

18 Claims, 7 Drawing Sheets

(51) Int. Cl.

| | |
|---|---|
| *G01S 7/481* | (2006.01) |
| *G02B 5/09* | (2006.01) |
| *G02B 7/185* | (2021.01) |
| *G02B 26/06* | (2006.01) |
| *G02B 27/00* | (2006.01) |

(52) U.S. Cl.
CPC .............. *G01S 7/4811* (2013.01); *G02B 5/09* (2013.01); *G02B 7/185* (2013.01); *G02B 26/06* (2013.01); *G02B 27/0068* (2013.01)

(56) References Cited

U.S. PATENT DOCUMENTS

| | | | |
|---|---|---|---|
| 6,181,450 B1 | 1/2001 | Dishman et al. | |
| 6,271,953 B1 | 8/2001 | Dishman et al. | |
| 6,327,063 B1 | 12/2001 | Rockwell | |
| 6,567,574 B1 | 5/2003 | Ma et al. | |
| 6,792,028 B2 | 9/2004 | Cook et al. | |
| 7,304,296 B2 | 12/2007 | Mills et al. | |
| 7,593,641 B2 | 9/2009 | Tegge, Jr. | |
| 7,626,152 B2 | 12/2009 | King et al. | |
| 7,660,235 B2 | 2/2010 | Alicherry et al. | |
| 7,667,190 B2 | 2/2010 | Mills et al. | |
| 7,969,558 B2 | 6/2011 | Hall | |
| 8,076,624 B1* | 12/2011 | Barchers | F41H 13/005 |
| | | | 356/512 |
| 8,164,037 B2 | 4/2012 | Jenkins et al. | |
| 8,301,027 B2 | 10/2012 | Shaw et al. | |
| 8,305,578 B1 | 11/2012 | Mudge et al. | |
| 8,311,372 B2 | 11/2012 | Anderson et al. | |
| 8,362,410 B2 | 1/2013 | King et al. | |
| 8,368,889 B2 | 2/2013 | Schwiegerling et al. | |
| 8,380,025 B2 | 2/2013 | Anderson et al. | |
| 8,463,080 B1 | 6/2013 | Anderson et al. | |
| 8,767,190 B2 | 7/2014 | Hall | |
| 8,823,848 B2 | 9/2014 | Chipman et al. | |
| 8,983,293 B2 | 3/2015 | Frankel et al. | |
| 9,473,768 B2 | 10/2016 | Uyeno et al. | |
| 9,477,135 B1 | 10/2016 | Uyeno et al. | |
| 9,632,166 B2 | 4/2017 | Trail et al. | |
| 9,857,226 B2 | 1/2018 | LeMaster et al. | |
| 9,904,081 B2 | 2/2018 | Uyeno et al. | |
| 9,927,515 B2 | 3/2018 | Keller et al. | |
| 10,148,056 B2 | 12/2018 | Uyeno et al. | |
| 10,209,439 B2 | 2/2019 | Keller et al. | |
| 10,243,654 B1 | 3/2019 | Uyeno et al. | |
| 10,267,915 B2 | 4/2019 | Uyeno et al. | |
| 10,381,701 B2 | 8/2019 | Motoi | |
| 10,444,492 B2 | 10/2019 | Hopkins et al. | |
| 10,718,491 B1 | 7/2020 | Raring et al. | |
| 10,969,598 B2 | 4/2021 | Fest et al. | |
| 10,998,965 B2 | 5/2021 | Tong et al. | |
| 11,042,025 B2 | 6/2021 | Uyeno et al. | |
| 11,333,879 B2 | 5/2022 | Uyeno et al. | |
| 11,477,350 B2 | 10/2022 | Uyeno et al. | |
| 11,550,146 B2 | 1/2023 | Uyeno et al. | |
| 2002/0141689 A1 | 10/2002 | Qian et al. | |
| 2002/0196506 A1 | 12/2002 | Graves et al. | |
| 2003/0062468 A1 | 4/2003 | Byren et al. | |
| 2003/0081321 A1 | 5/2003 | Moon et al. | |
| 2003/0185488 A1 | 10/2003 | Blumenthal | |
| 2004/0072540 A1 | 4/2004 | Wilson et al. | |
| 2004/0081466 A1 | 4/2004 | Walther et al. | |
| 2004/0141752 A1 | 7/2004 | Shelton et al. | |
| 2004/0258415 A1 | 12/2004 | Boone et al. | |
| 2005/0013003 A1 | 1/2005 | Marom | |
| 2005/0031255 A1 | 2/2005 | Schroeder et al. | |
| 2005/0100339 A1 | 5/2005 | Tegge | |
| 2005/0122566 A1 | 6/2005 | Cicchiello | |
| 2005/0288031 A1 | 12/2005 | Davis et al. | |
| 2006/0038103 A1 | 2/2006 | Helmbrecht | |
| 2007/0031157 A1 | 2/2007 | Yamada et al. | |
| 2007/0036480 A1 | 2/2007 | Wu | |
| 2008/0050064 A1 | 2/2008 | Sakai et al. | |
| 2009/0202254 A1 | 8/2009 | Majumdar et al. | |

| | | | |
|---|---|---|---|
| 2010/0149533 A1 | 6/2010 | Fest | |
| 2010/0166430 A1 | 7/2010 | Alten | |
| 2012/0002973 A1 | 1/2012 | Bruzzi et al. | |
| 2012/0008133 A1 | 1/2012 | Silny et al. | |
| 2012/0018614 A1* | 1/2012 | King | G02B 26/0816 |
| | | | 250/201.9 |
| 2012/0114337 A1 | 5/2012 | Aoki | |
| 2012/0155885 A1 | 6/2012 | Hannah et al. | |
| 2012/0168605 A1 | 7/2012 | Milanovic | |
| 2013/0271818 A1 | 10/2013 | Bastien et al. | |
| 2014/0063299 A1 | 3/2014 | Fest et al. | |
| 2015/0099476 A1 | 4/2015 | Beals | |
| 2015/0172218 A1 | 6/2015 | Beshai | |
| 2015/0311981 A1 | 10/2015 | Inagaki et al. | |
| 2015/0378242 A1 | 12/2015 | Auxier et al. | |
| 2016/0003677 A1 | 1/2016 | Pezzaniti et al. | |
| 2016/0043800 A1 | 2/2016 | Kingsbury et al. | |
| 2016/0234703 A1 | 8/2016 | Aldana et al. | |
| 2016/0294472 A1 | 10/2016 | Palmer et al. | |
| 2016/0349529 A1* | 12/2016 | Protz | G01S 17/66 |
| 2017/0293137 A1 | 10/2017 | Zhao et al. | |
| 2018/0180872 A1 | 6/2018 | Hopkins et al. | |
| 2018/0231715 A1 | 8/2018 | Bishop et al. | |
| 2018/0267299 A1 | 9/2018 | Sitter, Jr. et al. | |
| 2018/0356287 A1 | 12/2018 | Trent et al. | |
| 2019/0066320 A1 | 2/2019 | Uyeno et al. | |
| 2019/0154921 A1 | 5/2019 | Xing et al. | |
| 2020/0244359 A1 | 7/2020 | Csonka et al. | |
| 2021/0088776 A1 | 3/2021 | Uyeno et al. | |
| 2021/0091854 A1 | 3/2021 | Uyeno et al. | |
| 2021/0092260 A1 | 3/2021 | Uyeno et al. | |
| 2022/0229160 A1 | 7/2022 | Uyeno et al. | |
| 2022/0229285 A1 | 7/2022 | Uyeno et al. | |
| 2022/0232144 A1 | 7/2022 | Uyeno et al. | |
| 2022/0236383 A1 | 7/2022 | Uyeno et al. | |
| 2022/0252866 A1* | 8/2022 | Payne | G03F 7/70291 |

FOREIGN PATENT DOCUMENTS

| | | | | |
|---|---|---|---|---|
| CN | 1393710 A | 1/2003 | | |
| CN | 1393711 A | 1/2003 | | |
| CN | 1393712 A | 1/2003 | | |
| CN | 1393714 A | 1/2003 | | |
| CN | 110045496 A * | 7/2019 | ......... | G02B 27/1006 |
| CN | 110226103 A | 9/2019 | | |
| CN | 111487771 A * | 8/2020 | ............ | G02B 26/06 |
| DE | 102011104023.8 B4 | 7/2019 | | |
| EP | 2667142 A1 | 11/2013 | | |
| EP | 2137567 | 4/2018 | | |
| EP | 2533003 B1 | 8/2018 | | |
| WO | WO-2005125193 A1 | 12/2005 | | |
| WO | WO-2006042696 A1 | 4/2006 | | |
| WO | WO-2010032224 A2 | 3/2010 | | |
| WO | WO-2010049076 A2 | 5/2010 | | |
| WO | WO-2014145792 A1 | 9/2014 | | |
| WO | WO-2014200581 A2 | 12/2014 | | |
| WO | WO-2023064085 A2 | 4/2023 | | |
| WO | 2023064085 | 7/2023 | | |

OTHER PUBLICATIONS

U.S. Appl. No. 17/152,023, filed Jan. 19, 2021, Small Angle Optical Beam Steering Using Micro-Electro-Mechanical System (MEMS) Micro-Mirror Arrays (MMAS).

U.S. Appl. No. 17/150,286, filed Jan. 15, 2021, Active Imaging Using A Micro-Electro-Mechanical System (MEMS) Micro-Mirror Array (MMA).

U.S. Appl. No. 17/159,967, filed Jan. 27, 2021, Micro-Electro-Mechanical System (MEMS) Micro-Mirror Array (MMA) Steered Active Situational Awareness Sensor.

U.S. Appl. No. 17/150,330, filed Jan. 15, 2021, Optical System for Object Detection and Location Using A Micro-Electro-Mechanical System (MEMS) Micro-Mirror Array (MMA) Beamsteering Device.

"MEMS Mirror Array—Beam Steering Mode", [Online]. Retrieved from the Internet: <www.youtube.com/watch?v=wHIUU3kKtzM>, (Aug. 10, 2017), 2 pgs.

(56) References Cited

OTHER PUBLICATIONS

Rodriguez, et al., "Beam steering by digital micro-mirror device for multi-beam and single-chip lidar", Proc. SPIE 10757, Optical Data Storage 2018: Industrial Optical Devices and Systems, (Sep. 14, 2018), 7 pgs.

Ryf, et al., "MEMS tip/tilt and piston mirror arrays as diffractive optical elements", Proc. SPIE 5894, Advanced Wavefront Control: Methods, Devices, and Applications III, (Aug. 30, 2005), 12 pgs.

Tsou, et al., "Extended-image spatial tracking technique for deep-space optical downlinks", Proc. SPIE 3762, Adaptive Optics Systems and Technology, (Sep. 27, 1999), 101-109.

Tuantranont, et al., "Optical beam steering using MEMS-controllable microlens array", Sensors and Actuators A: Physical vol. 91, Issue 3, (Jul. 15, 2001), 363-372.

"U.S. Appl. No. 16/871,602, Non Final Office Action mailed Nov. 9, 2020", 18 pgs.

"U.S. Appl. No. 16/871,602, Notice of Allowance mailed Feb. 24, 2021", 5 pgs.

"U.S. Appl. No. 16/871,602, Response filed Feb. 8, 2021 to Non Final Office Action mailed Nov. 9, 2020", 12 pgs.

"U.S. Appl. No. 17/007,917, Non Final Office Action mailed Aug. 3, 2021", 35 pgs.

"U.S. Appl. No. 17/007,917, Notice of Allowance mailed Jan. 10, 2022", 14 pgs.

"U.S. Appl. No. 17/007,917, Response filed Dec. 1, 2021 to Non Final Office Action mailed Aug. 3, 2021", 16 pgs.

"U.S. Appl. No. 17/007,917, Supplemental Notice of Allowability mailed Apr. 19, 2022", 2 pgs.

"U.S. Appl. No. 17/150,286, Non Final Office Action mailed Mar. 9, 2022", 13 pgs.

"High Contrast IR Wire Grid Polarizers", Edmund Optics, [Online]. Retrieved from the Internet: < URL: https://www.edmundoptics.com/f/high-contrast-ir-wire-grid-polarizers/14797/>, (Accessed Sep. 4, 2021), 1 pg.

"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.

"Mirrorcle Technologies MEMS Mirrors—Technical Overview", Mirrorcle Technologies, Inc., (2018), 7 pgs.

Ayral, J.-L., et al., "Phase-conjugate Nd:YAG laser with internal acousto-optic beam steering", Optics Letters, vol. 16, No. 16, (Aug. 15, 1991), 1225-1227.

Bishop, Bob, "Northrop Grumman-Developed Beacon Illuminator Laser Proves Reliability in Airborne Laser Ground, Air Tests", Northrop Grumman Corporation, [Online]. Retrieved from the Internet: <URL: https://news.northropgrumman.com/news/releases/northrop-grumman-developed-beacon-illuminator-laser-proves-reliability-in-airborne-laser-ground-air-tests?>, (Aug. 13, 2009), 2 pgs.

Chiu, Yi, et al., "Shape-Optimized Electrooptic Beam Scanners: Analysis, Design, and Simulation", Journal of Lightwave Technology, vol. 17, No. 1, (Jan. 1999), 108-114.

Kelchner, Bryan, et al., "ABL beam control segment", SPIE, vol. 3381, (Sep. 8, 1998), 6 pgs.

Kim, et al., "Demonstration of large-angle nonmechanical laser beam steering based on LC polymer polarization grating", Proc. of SPIE vol. 8052 80520T, (May 13, 2011), 13 pgs.

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280 × 720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 11 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Siegman, A. E., "Unstable optical resonators for laser applications", Proceedings of the IEEE, vol. 53, Issue 3, (Mar. 1965), 277-287.

Wang, Jinxue, et al., "Doppler Winds Lidar Technology Development and Demonstration", AIAA-2005-6772, Space 2005, Long Beach, California, Aug. 30-1, 2005, (2005), 11 pgs.

Yamamoto, R., et al., "Evolution of a Solid State Laser", Proc. SPIE 6552, Laser Source Technology for Defense and Security III, 655205, (May 10, 2007), 11 pgs.

"International Application Serial No. PCT US2022 044535, International Search Report mailed Jun. 6, 2023", 4 pgs.

"International Application Serial No. PCT US2022 044535, Written Opinion mailed Jun. 6, 2023", 11 pgs.

Bing, Dong, "Dynamic Aberration Correction for Conformal Window of High-Speed Aircraft Using Optimized Model-Based Wavefront Sensorless Adaptive Optics", Sensors, vol. 16, No. 9, (Sep. 2, 2016), 13 pgs.

"U.S. Appl. No. 17/150,286, Notice of Allowance mailed Jun. 17, 2022", 10 pgs.

"U.S. Appl. No. 17/150,286, Response filed Apr. 29, 2022 to Non Final Office Action mailed Mar. 9, 2022", 12 pgs.

"U.S. Appl. No. 17/152,023, Notice of Allowance mailed Sep. 21, 2022", 9 pgs.

* cited by examiner

WAVEFRONT CORRECTION FOR AERODYNAMIC AND ATMOSPHERIC EFFECTS TO AN OPTICAL SENSOR ON A HIGH-SPEED FLIGHT VEHICLE

CROSS-REFERENCE TO RELATED APPLICATIONS

This application claims benefit of priority under 35 U.S.C. 119(e) to U.S. Provisional Application No. 63/248,623 entitled "Wavefront Correction for Aerodynamic and Atmospheric Effects on an Optical Sensor on a High-Speed Flight Vehicle" and filed on Sep. 27, 2021, the entire contents of which are incorporated by reference.

BACKGROUND OF THE INVENTION

Field of the Invention

This invention relates to optical sensing systems on-board supersonic flight vehicles with high resolution electro-optic infrared (EO/IR) sensors, and more particularly to a system and method for sensing aerodynamic effects (optical and thermal) on or immediately in front of the vehicle's window or dome and compensating for those effects. The system may also be configured to measure and compensate for atmospheric effects such as turbulence between the flight vehicle and a target.

Description of the Related Art

Flight vehicles such as missiles, rockets, guided projectiles, drones, manned aircraft etc. employ EO/IR sensors to detect, track, classify and select aim points on targets. It is critical that the actual location of a target in the sensor's field-of-view (FOV) is very close to the location of the target detected by the EO/IR sensor. Certain in-flight conditions such as aerodynamic effects on or immediately in front of the sensor's optically transparent window/dome or atmospheric effects (e.g., turbulence) between the sensor and the target can cause errors in target locations that impact system performance.

Aerodynamic effects include aero-optical and aero-thermal effects. Aero-optical effects are caused by fluctuations of refractive index due to temperature and pressure differences in the air around the flight vehicle, which may be caused by compression of air and turbulence around the flight vehicle such as turbulence from thick boundary layers, dome physical distortion, shock waves, plasmas, and atmospheric turbulence. These variations in index will affect light passing through this air by creating a phase difference across the wavefront, called wavefront distortion, which spreads and distorts the light that comes to a focus at an image plane. Wavefront distortion may also alter the apparent angle of arrival of light entering an EO/IR sensor. Aero-thermal effects are caused by heating of the window/dome and optical system by compression of the air by the flight vehicle operating at high speeds. The heating of the window causes variations in refractive index and distortion of the window shape. This in turn affects light passing through the window and optical system by creating a phase difference across the wavefront that spreads and distorts the light that comes to a focus at an image plane. Wavefront distortion due to window heating and shape distortion may also alter the apparent angle of arrival of light entering an EO/IR sensor.

Most existing flight vehicles do not fly fast enough (e.g., supersonic) or have EO/IR imaging systems of sufficiently high resolution that either the aerodynamic or atmospheric effects are significant enough to require correction or to justify the cost/volume/weight in overall system design. A few high-speed systems use a look up table (LUT) that is a function of vehicle speed to look up and apply corrections in software to the target data derived from images that are read out. The optical system is modeled to estimate aero-optical and aero-thermal effects as a function of speed. The software solution does not add appreciably to the weight/volume/cost. However, the actual conditions and flight path of the flight vehicle may be more complex than can be represented by the model. This can result in lower quality estimates of target state information such as target position and target velocity. Ultimately, the LUT is a "model", not a measurement. Optical wavefront distortion effects which degrade sensor resolution are typically not addressed on-board high-speed flight vehicles, and must be accommodated in the error budget for system performance.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for measurement and correction of aero-optical and aero-thermal effects to an EO/IR sensor's window/dome on a supersonic flight-vehicle.

In an embodiment, an optical sensor for a supersonic flight vehicle in which an optical window to the sensor undergoes aero-optical and aero-thermal effects in flight, includes a pulsed laser that emits laser pulses through the optical window with timing codes referenced to a clock, a wavefront sensor referenced to the clock to detect returning laser pulses that lie within a short time delay window to measure the aero-optical and aero-thermal effects on or just in front of the optical window, an optical detector, an optical path that couples light received through the optical window onto the optical detector and a deformable mirror positioned in the optical path, said deformable mirror responsive to command signals to piston orthogonal to the plane of the mirror to correct a wavefront of the received light for the measured aero-optical and aero-thermal effects.

In different embodiments, the wavefront sensor detects returning laser pulses that lie within a long time delay window to measure atmospheric effects beyond the optical window. The pulses for the long time delay window may be lengthened to improve SNR.

The returned laser pulses in the long time delay windows may be corrected and sensed by the optical detector to locate a target ("active imaging"). A first control algorithm and control loop measures the aero-optical and aero-thermal effects and updates the deformable mirror at a slow update rate and a second control algorithm and control loop measures the atmospheric effects and updates the deformable mirror at a fast update rate. Separating the control algorithms and loops simplifies the algorithms and improves performance.

In different embodiments, the deformable mirror is one of (a) a single mirror with piston actuators, (b) multiple segmented mirrors with respective piston actuators or (c) multiple segmented mirrors with respective tip, tilt and piston actuators. In a configuration, the deformable mirror comprises a Micro-Electro-Mechanical System (MEMS) Micro-Mirror Array (MMA) that includes a plurality of mirrors independently responsive to command signals to tip and tilt about first and second axes, respectively, and to piston in translation along a third axis in three degrees-of-freedom (3DOF) to correct the wavefront. This device allows for a range of translation along the third axis for piston is greater than 1 wavelength at the laser wavelength or received light center wavelength. This device allows for tip and tilt to control a local slope to reduce aberrations.

In different embodiments, the deformable mirror is placed at or near (as packaging inside the sensor allows) the optical conjugate location of the window (the source of the wavefront distortions). Multiple deformable mirrors may be placed near different optical conjugate locations of different sources of wavefront distortion. A first deformable mirror may be placed at a pupil conjugate location and a second deformable mirror may be placed at an intermediate image conjugate location in the optical path.

In an embodiment, an optical sensor for a supersonic flight vehicle in which an optical window to the sensor undergoes aero-optical and aero-thermal effects in flight comprises one or more optical detectors and an optical path that couples light from a target returned through the optical window onto the optical detector. A laser emits laser energy into a beam combiner in the optical path that combines the laser energy to propagate in the optical path through the optical window. A wavefront sensor in the optical path detects returning laser energy (split off by a beam splitter) to measure the aero-optical and aero-thermal effects on or just in front of the optical window. A deformable mirror positioned in the optical path upstream of the wavefront sensor and the laser is responsive to command signals to piston orthogonal to the plane of the mirror to correct a wavefront of the emitted laser energy and to correct a wavefront of the returned laser energy and received passive light for the measured aero-optical and aero-thermal effects. The one or more optical detectors are configured to sense both the wavefront corrected returned laser energy and wavefront corrected received passive light to form active and passive images of the target. In a configuration, the laser emits laser pulses with timing codes referenced to a clock and the wavefront sensor detects returning laser pulses referenced to the clock that lie in a short time delay window to measure aero-optical and aero-thermal effects of the vehicle window and near the vehicle window. The laser emits pulses in a long time delay window to also measure atmospheric effects from the optical path beyond the vehicle window. In a configuration, a gimbal is used to point the laser and the optical path.

In an embodiment, an optical sensor for a supersonic flight vehicle in which an optical window to the sensor undergoes aero-optical and aero-thermal effects in flight includes an optical detector, an optical path that couples light received through the optical window onto the optical detector and a MEM MMA positioned in the optical path. The MMA comprises a plurality of mirrors independently responsive to command signals to tip and tilt about first and second axes, respectively, and to piston in translation along a third axis in three degrees-of-freedom (3DOF) to correct a wavefront of the received light for the measured aero-optical and aero-thermal effects. The MMA allows for a range of translation along the third axis for piston is greater than 1 wavelength at the laser wavelength or received light center wavelength. The MMA allows for tip and tilt to control a local slope to reduce aberrations. The command signals for the MEMS MMA may be provided by (a) a LUT indexed by speed, (b) CW or pulsed laser w/a wavefront sensor which may or may not be integrated into the optical path to the detector and which may be on or off the flight vehicle.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a system and method for measurement and correction of aero-optical and aero-thermal effects to an EO/IR sensor's window/dome; on a supersonic flight-vehicle. At flight speed in excess of Mach 1 (supersonic) and at higher resolutions of modern EO/IR sensor, the impact of aerodynamic (aero-optical and aero-thermal effects) on the sensor's window/dome get much worse and the impact on the higher resolution sensors more problematic. Atmospheric effects beyond the window/dome and to a target also have a greater effect on higher resolution sensors.

Figure 1:
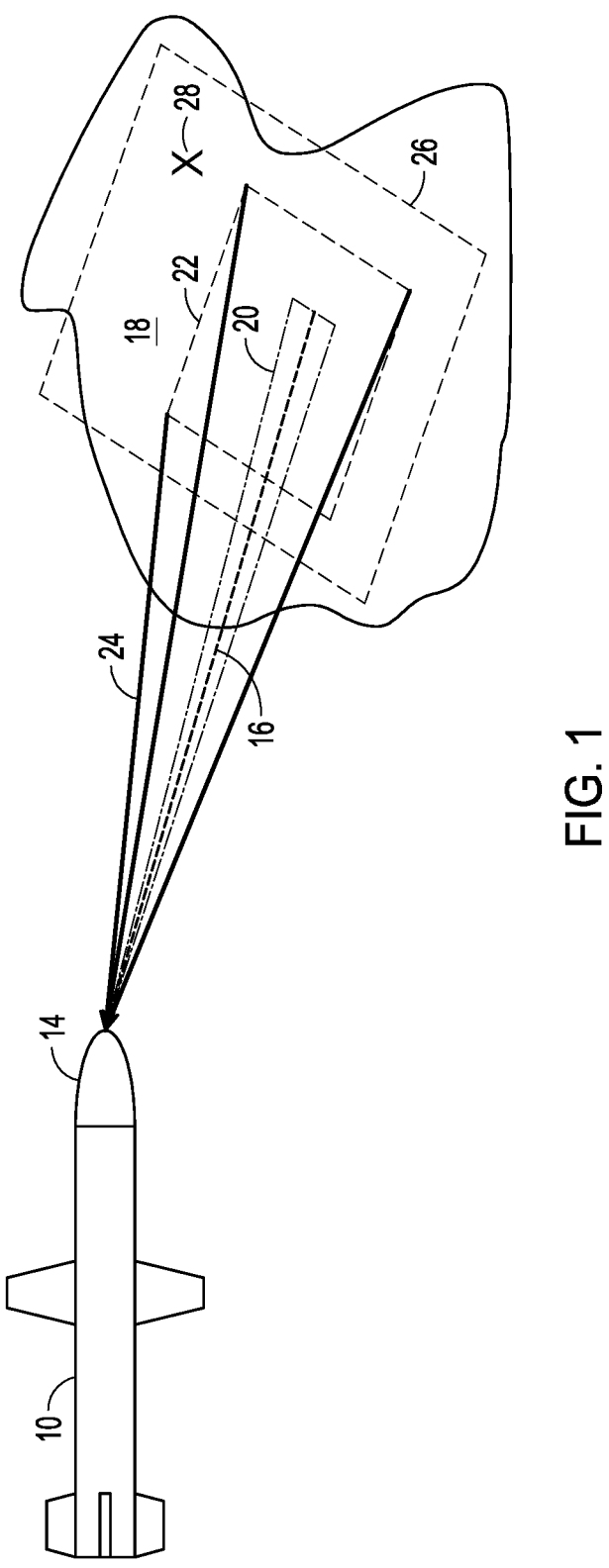
FIG. 1 is an optical sensor in which a transmit beam is used as both a source for wavefront measurement and correction and for active detection and passive detection.
Figure 2:
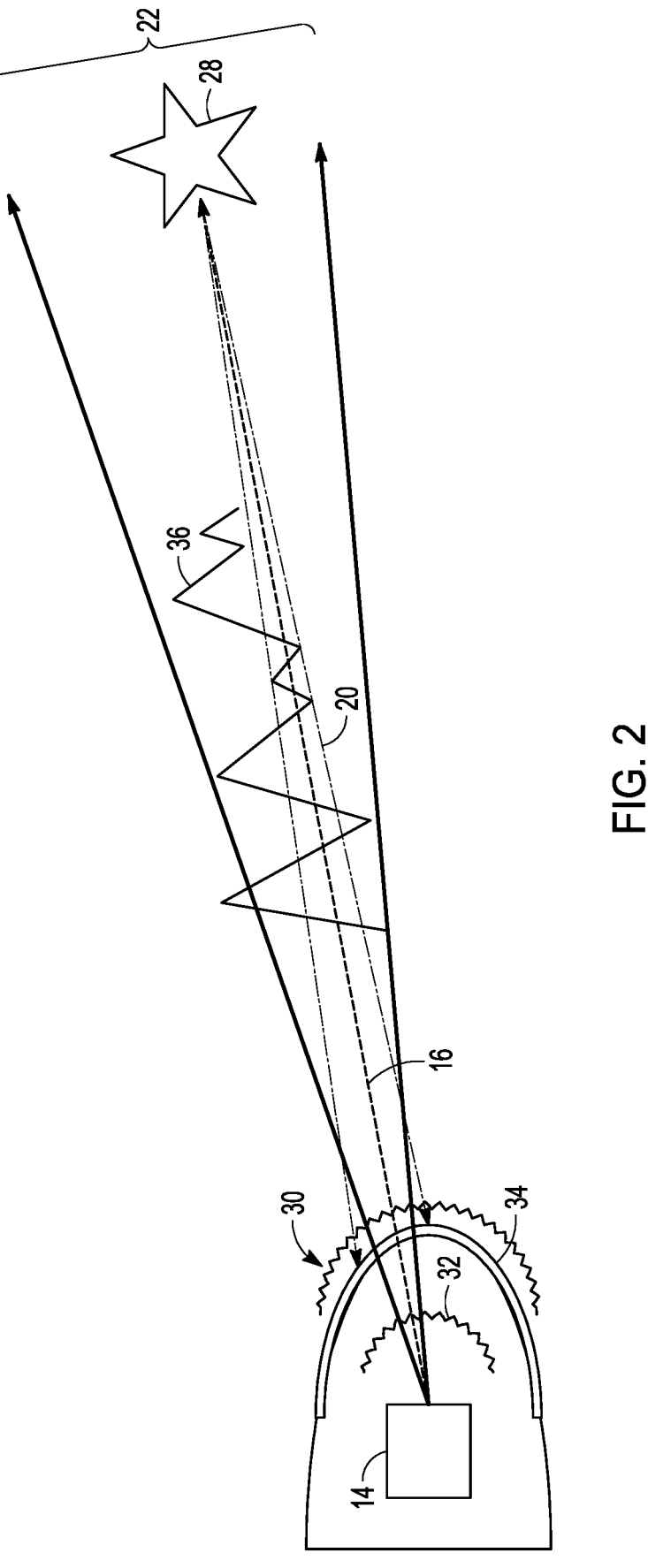
FIG. 2 is an illustration of aerodynamic and atmospheric effects between a supersonic flight vehicle and a target.

Referring now to FIGS. 1 and 2, a supersonic flight vehicle 10 such as a missile, rocket, projectile etc., is provided with a gimbaled optical sensor 14. The gimbaled optical sensor directs a laser beam 16 towards a scene 18, which reflects the light to generate a laser return 20 that is collected by the sensor's telescope. Within the sensor's field-of-view (FOV) 22 passive emissions or visible reflections 24 are also collected by the sensor's telescope. The gimbal scans the laser beam 16 and sensor FOV 22 over a larger field-of-regard 26 to detect a target 28. The laser beam, and thus the returns, may be in the same or different band as the passive light. For example, the passive light may span a portion of the near infrared (NIR) band and the laser beam could occupy a very narrow band (few nm) around a specific wavelength(s) in the NIR band. Alternately, the passive light may span a portion of the NIR band and the laser beam could occupy a narrow band around a specific wavelengths(s) in the visible band. Other combinations of in and out of band active and passive light will exist. The sensor may be configured to not sense the laser return.

A wavefront sensor detects the laser returns 20 to measure the aero-optical 30 and aero-thermal 32 effects on or just in front of the optical window/dome 34 and possibly atmospheric effects 36 (e.g., turbulence) beyond the window/dome to the target 28. A deformable mirror positioned in the optical path is responsive to command signals to piston orthogonal to the plane of the mirror to correct a wavefront of the received light for the measured aero-optical and aero-thermal effects and possibly the atmospheric effects.

In a configuration, the laser emits laser pulses with timing codes referenced to a clock and the wavefront sensor detects returning laser pulses referenced to the clock that lie in a short time delay window to measure aero-optical and aero-thermal effects and in a long time delay window to measure atmospheric effects and form the active images. In a configuration, a gimbal is used to point the laser and the optical path.

In a configuration, the deformable mirror is a MEMS MMA comprising a plurality of mirrors independently responsive to command signals to tip and tilt about first and second axes, respectively, and to piston in translation along a third axis in three degrees-of-freedom (3DOF) to correct a wavefront of the received light for the measured aero-optical and aero-thermal effects. The MMA allows for a range of translation along the third axis for piston is greater than 1 wavelength at the laser wavelength or received light center wavelength. The MMA allows for tip and tilt to control a local slope to reduce aberrations.

Figure 3:
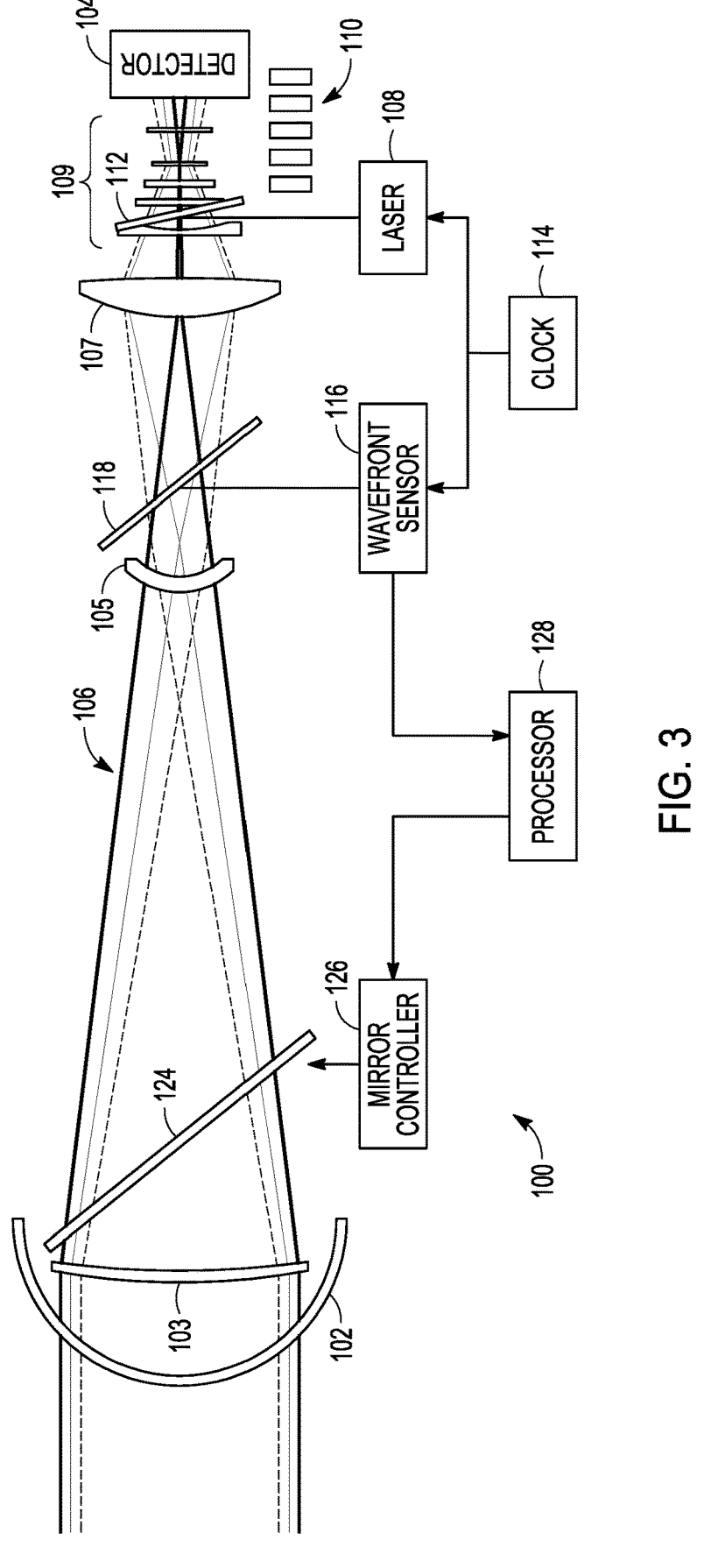
FIG. 3 is a simplified optical schematic in which a laser beam is folded into the optical path for a passive detector, a laser return is split off to a wavefront sensor and a deformable mirror is controlled to correct the wavefront of either active returns or passive light for aerodynamic and atmospheric effects.
Figure 4:
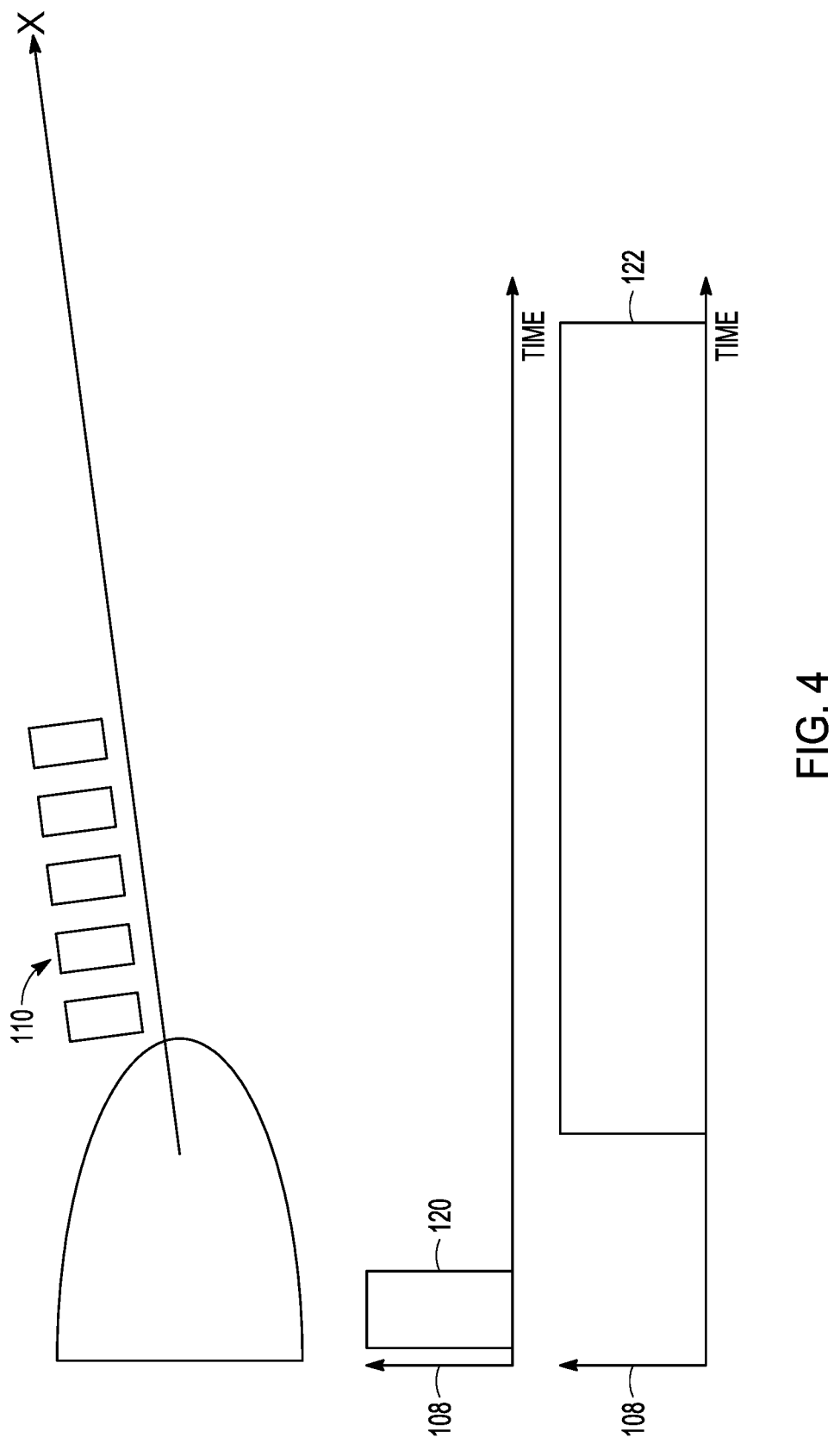
FIG. 4 is an illustration in which a pulsed laser is range-gated to separately measure the aerodynamic effects on or immediately in front of the window/dome and the atmospheric effects between the vehicle and the target.
Figure 5:
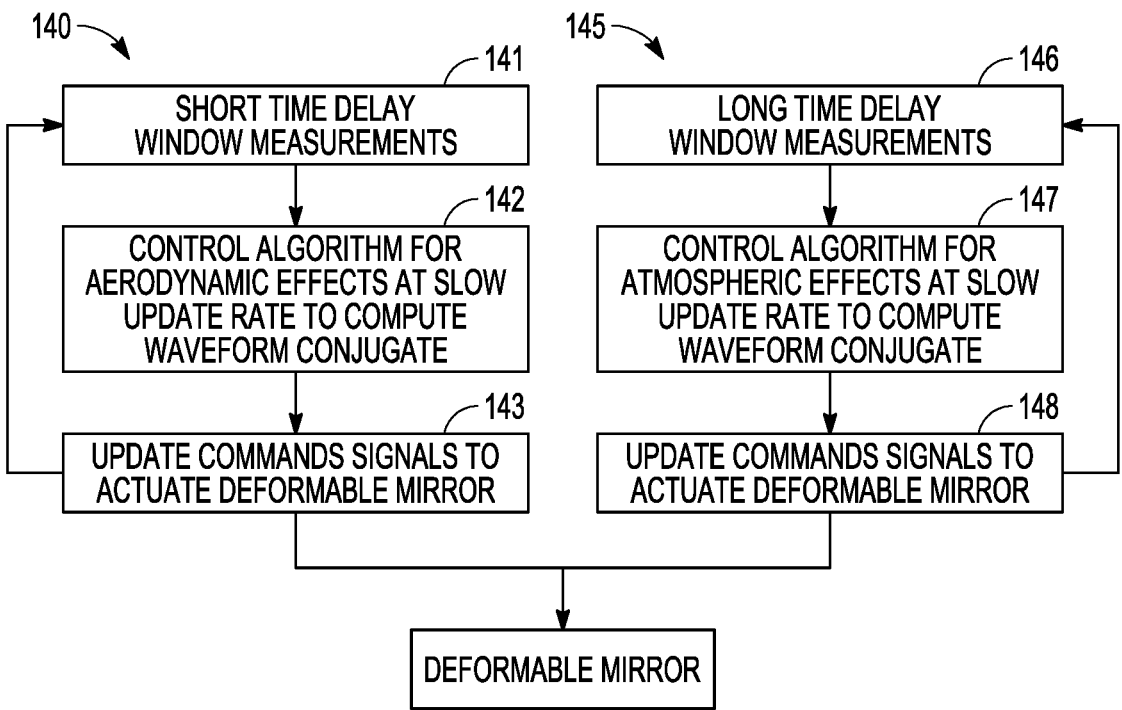
FIG. 5 is an embodiment in which separate control algorithms and control loops are configured to update corrections for the deformable mirror to address slower aerodynamic effects and faster atmospheric effects, respectively.

Referring now to FIGS. 3, 4 and 5, an embodiment of an optical sensor 100 for a supersonic flight vehicle in which an optical window/dome 102 to the sensor undergoes aero-optical and aero-thermal effects in flight includes one or more optical detectors 104 and an optical path 106 including a plurality of optical elements that couples light from a target returned through the optical window/dome 102 onto the one or more optical detectors. The optical path is suitably routed through a dual-axis gimbal to point over a field-of-regard (FOR). Alternately, pointing can be achieved by maneuvering the flight vehicle. Optical path 106 includes a focusing element 103 positioned behind optical window/dome 102, a field lens optical element 105, and optical elements 107 and 109, which relay the intermediate after element 105 to detector 104.

A pulsed laser 108 (UV, IR, Visible) emits laser pulses 110 that are combined into the optical path via beam combiner 112 and transmitted through the optical window/dome. The laser pulses include timing codes referenced to a clock 114. A wavefront sensor 116 referenced to the clock is positioned relative to a beam splitter 118 in the optical path to detect returning laser pulses that lie within a short time delay window 120 to measure the aero-optical and aero-thermal effects on or just in front of the optical window and a long time delay window 122 to measure atmospheric effects beyond the window/dome and to the target. The short and long time delay windows correspond to shorter and longer round trip times, respectively, for the laser pulses 110 for range-gating. A deformable mirror 124 is positioned in the optical path and is responsive to command signals from a mirror controller 126 to piston orthogonal to the plane of the mirror to correct a wavefront of the received light for the measured aero-optical and aero-thermal effects. For simplicity, deformable mirror 124 is drawn in an unfolded optical layout. It functions as a fold mirror that can apply phase corrections to a wavefront by actively articulating the mirror or mirror elements. A processor 128 receives the wavefront measurements and computes the actuation command signals that are provided to the mirror controller.

In different embodiments, the deformable mirror 124 is placed at or near (as packaging inside the sensor allows) the optical conjugate location of the window (the source of the wavefront distortions). Multiple deformable mirrors 124 may be placed at or near different optical conjugate locations of different sources of wavefront distortion. A first deformable mirror may be placed at a pupil conjugate location and a second deformable mirror may be placed at an intermediate image conjugate location in the optical path.

The returned laser pulses in the long time delay windows may be corrected by the deformable mirror and sensed by the optical detector to locate a target ("active imaging").

In an embodiment, a single point measurement of the laser through the window/dome may be compared to a model based on geometry, materials, temperature gradients, compression effects etc. across the window/dome. For instance, one model might describe a linear heating of a window that is hotter near the leading edge of the vehicle compared to the edge farther away. An analytical model could predict the heating of the window over a high speed flight with assumptions on angle of attack and atmospheric conditions. By directly measuring a wavefront through the window at a given point in time, one can compare this to the model to determine which conditions create this wavefront (thermal variation) through this part of the window and thus predict the temperature and shape of the window at other places outside of the optical footprint on the window.

Referring now to FIG. 5, a first control loop 140 receives short time delay window measurements of the aero-optical and aero-thermal effects 141, applies a control algorithm for aerodynamic effects at a slow update rate to compute waveform conjugate 142 and updates command signals 143 to actuate the deformable mirror at the slow update rate and a second control loop 145 receives long time delay window measurements of the atmospheric effects 146, applies a control algorithm for aerodynamic effects at a fast update rate to compute waveform conjugate 147 and updates command signals 148 to actuate the deformable mirror at a fast update rate. Separating the control algorithms and loops simplifies the algorithms and improves performance, Either or both control algorithms may, for example, be a Proportional-Integral-Derivative (PID) control loop algorithm.

The speed of the update rates refers to the relative change in wavefront distortion vs. time. In the case of wavefront distortions affecting performance of an EO/IR system in an aerial vehicle, changes will occur at different time scales. Aerodynamic heating of a window can occur over a period of seconds. The aerodynamic heating and deformation of the window surfaces will introduce a corresponding optical path difference that varies with the rate of heating and the rate of change of a sensor viewing angle through the window. Other aberrations can change relatively quickly. Specifically, air in a turbulent flow can have variations in density and temperature that change very quickly according to the speed of the flow. It can be advantageous to have a relatively slow optical correction loop that responds to slowly varying optical path distortions (e.g., the aerodynamic effects) of higher magnitude and a fast optical correction loop that responds to high rate variation optical path distortions (e.g., the atmospheric effects) of lower magnitude. This allows for the temporal bandwidth and optical path difference dynamic range of the corrective components such as deformable mirrors and MMAs to be matched against the physical processes causing the optical distortions.

In different embodiments, the deformable mirror is one of (a) a single mirror with piston actuators, (b) multiple segmented mirrors with respective piston actuators or (c) multiple segmented mirrors with respective tip, tilt and piston actuators. In a configuration, the deformable mirror comprises a MEMS MMA including a plurality of mirrors independently responsive to command signals to tip and tilt about first and second axes, respectively, and to piston in translation along a third axis in three degrees-of-freedom (3DOF) to correct the wavefront. This device allows for a range of translation along the third axis for piston is greater than 1 wavelength at the laser wavelength or received light center wavelength. This device allows for tip and tilt to control a local slope to reduce aberrations.

Figure 6A:
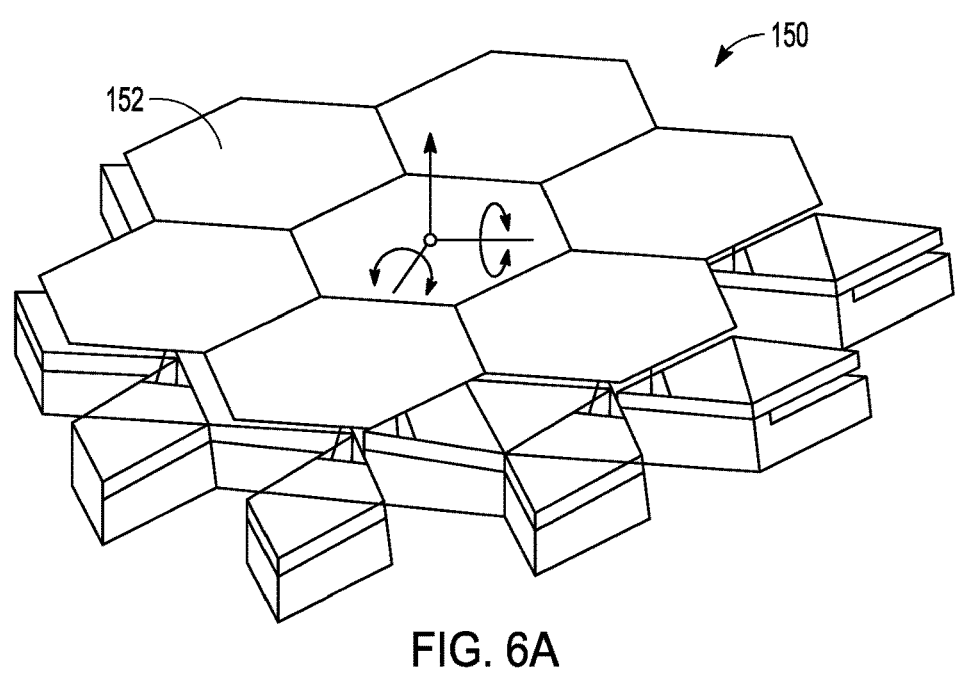
FIGS. 6A-6B are illustrations of a known embodiment of a Tip/Tilt/Piston ("TTP") MEMS MMA and a single mirror actuated to tip, tilt and piston to scan and correct the laser beam.
Figure 6B:
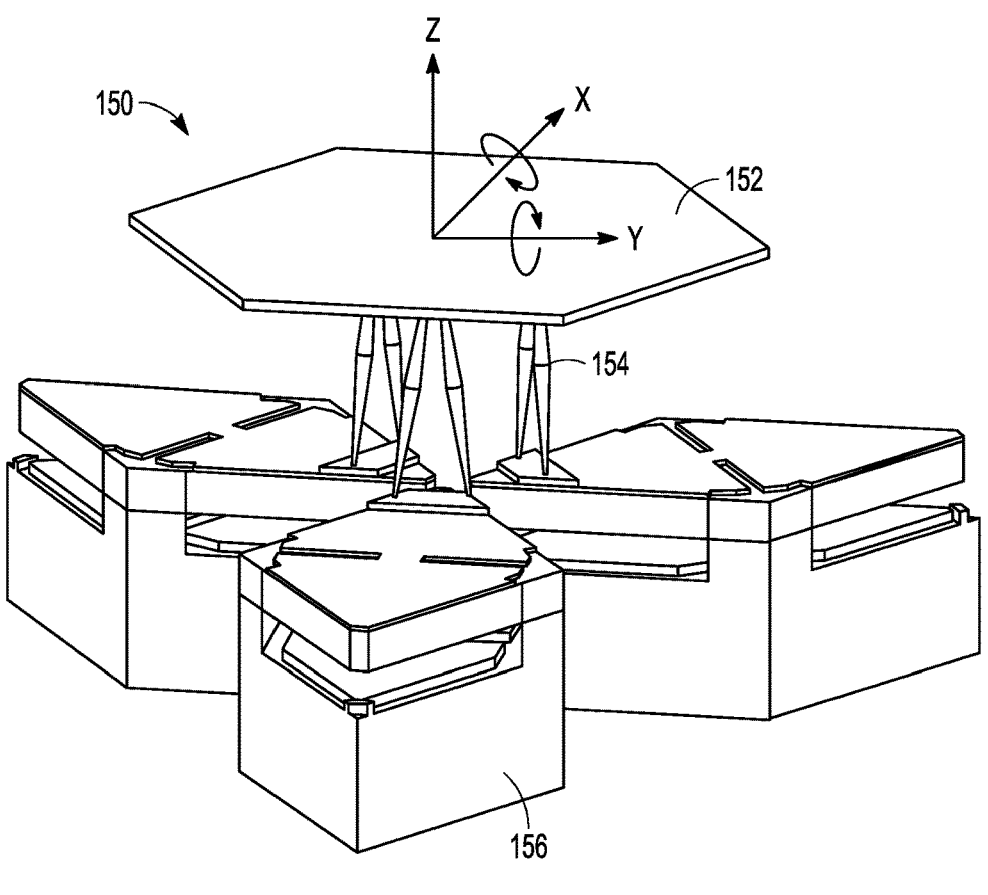

As best shown in FIGS. 6A-6B, an exemplary MEMS MMA 150 comprises a plurality of independently and continuously controllable mirrors 152 to re-direct light in three DOF. Each mirror is capable of at least "Tip" (rotation about an X-axis). "Tilt" (rotation about a Y-axis) and "Piston" (translation along a Z-axis, perpendicular to the XY plane) where the X, Y and Z are orthogonal axes in a three-dimensional space.

The MEMS MMA is preferably capable of tipping and tilting over range of at least −15°×+15° to steer over a range of +/−30°×30° and pistoning, (translating) over a range of at least +/−15 microns (at least one-half wavelength in either direction) piston at a rate of at least 1 KHz (<1 millisecond). Further, the MEMS MMA must have a sufficient number of mirrors, mirror size/resolution, fill factor, range of motion, response time, response accuracy and uniformity across the array.

One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures 154 to support each mirror 152 at three fulcrum points (or vertices) of an equilateral triangle. The three different pairs of fulcrum points define three axes at 60 degrees to one another in the XY plane. Each mirror pivots about each axis to produce tip, tilt and piston in the XYZ space in response to actuators 156. This MEMS MMA is currently being commercialized by Bright Silicon technologies for "digitally controlling light."

Figure 7:
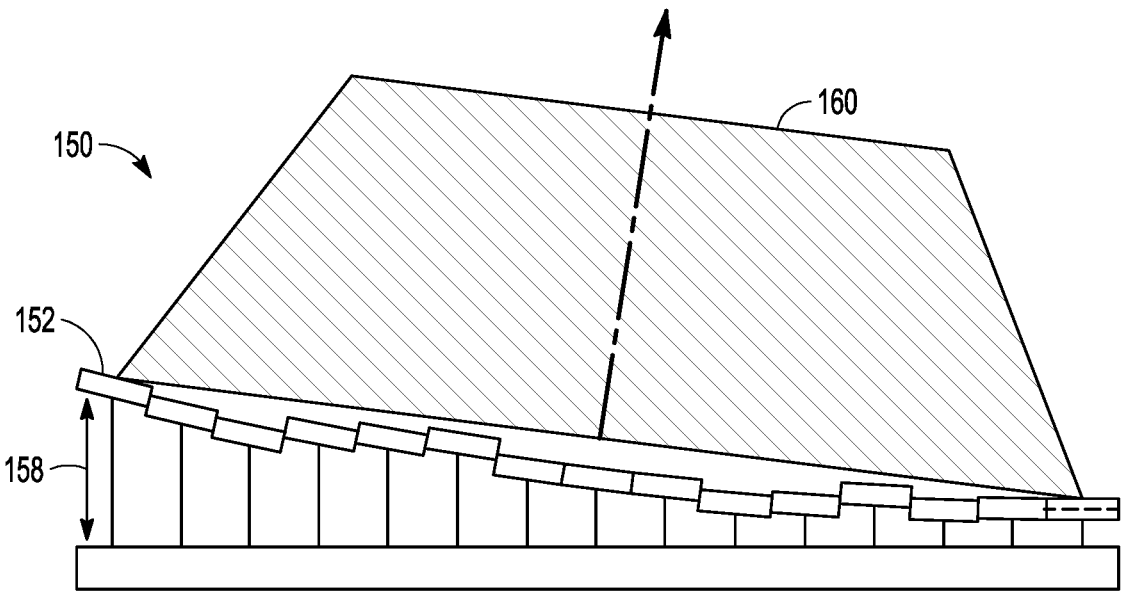
FIG. 7 is an illustration in which MEMS MMA piston is used to perform the primary wavefront correction and tip/tilt is used to provide local slope correction to reduce aberrations.

As shown in FIG. 7, mirrors 152 piston 158 in translation perpendicular to the plane of the array to correct the wavefront 160 of the light (laser pulses or passively received light). The mirrors may also tip/tilt to provide a local slope to reduce aberrations from discontinuities between adjacent mirrors.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical sensor for a supersonic flight vehicle in which an optical window to the sensor undergoes aero-optical and aero-thermal effects in flight, said optical-sensor comprising:

a clock;

a pulsed laser that emits laser pulses through the optical window with timing codes referenced to the clock;

a wavefront sensor referenced to the clock to detect returning laser pulses that lie within a first time delay window to measure the aero-optical and aero-thermal effects on or just in front of the optical window and to exclude atmospheric effects beyond the optical window, wherein aero-optical effects are caused by fluctuations of a refractive index of the optical window due to temperature and pressure differences around the optical window and aero-thermal effects are caused by heating of the optical window;

an optical detector;

an optical path that couples light received through the optical window onto the optical detector; and a deformable mirror positioned in the optical path, said deformable mirror responsive to command signals to piston orthogonal to the plane of the mirror to correct a wavefront of the received light for the measured aero-optical and aero-thermal effects.

2. The optical sensor of claim 1, wherein the wavefront sensor detects returning laser pulses that lie within a second time delay window to measure atmospheric effects beyond the optical window, said second time delay window having a longer time duration than said first time delay window corresponding to longer round-trip times for the laser pulses, wherein said deformable mirror is responsive to command signals to piston orthogonal to the plane of the mirror to correct the wavefront of received light for the measured atmospheric effects.

3. The optical sensor of claim 2, wherein the pulsed laser is controlled to lengthen the pulses for the second time delay window.

4. The optical sensor of claim 2, wherein returned laser pulses in the second time delay window are corrected and sensed by the optical detector to locate a target.

5. The optical sensor of claim 1, wherein the deformable mirror is one of (a) a single mirror with piston actuators, (b) multiple segmented mirrors with respective piston actuators or (c) multiple segmented mirrors with respective tip, tilt and piston actuators.

6. The optical sensor of claim 1, wherein the deformable mirror comprises a Micro-Electro-Mechanical System (MEMS) Micro-Mirror Array (MMA), said MMA comprising a plurality of mirrors independently responsive to command signals to tip and tilt about first and second axes, respectively, and to piston in translation along a third axis in three degrees-of-freedom (3DOF) to correct the wavefront.

7. The optical sensor of claim 6, wherein the range of translation along the third axis for piston is greater than 1 wavelength at the laser wavelength or a center wavelength of received light.

8. The optical sensor of claim 6, wherein the mirrors tip and tilt to control a local slope to reduce aberrations.

9. The optical sensor of claim 1, wherein the deformable mirror is placed at or near an optical conjugate location of the optical window.

10. The optical sensor of claim 1, wherein multiple deformable mirrors are placed at or near different optical conjugate locations of different sources of wavefront distortion.

11. The optical sensor of claim 1, where a first deformable mirror is placed at a pupil conjugate location and a second deformable mirror is placed at an intermediate image conjugate location in the optical path.

12. The optical sensor of claim 2, wherein a first control algorithm and control loop measures the aero-optical and aero-thermal effects and updates the deformable mirror at a first update rate and a second control algorithm and control loop measures the atmospheric effects and updates the deformable mirror at a second update rate, wherein said first update date rate is slower than said second update rate.

13. An optical sensor for a supersonic flight vehicle in which an optical window to the sensor undergoes aero-optical and aero-thermal effects in flight, said optical-sensor comprising:

one or more optical detectors;

an optical path that couples light from a target returned through the optical window onto the optical detector;

a clock;

a laser that emits laser pulses with timing codes referenced to the clock;

a beam combiner in the optical path that combines the laser pulses to propagate in the optical path through the optical window;

a beam splitter to split off a portion of returning laser pulses;

a wavefront sensor referenced to the clock to detect returning laser pulses that lie within a first time delay window to measure the aero-optical and aero-thermal effects on or just in front of the optical window and a second time delay window to measure atmospheric effects to a target, said second time delay window having a longer time duration than said first time delay window corresponding to longer round-trip times for the laser pulses; and a deformable mirror positioned in the optical path upstream of the wavefront sensor and the laser, said deformable mirror responsive to command signals to piston orthogonal to the plane of the mirror to correct a wavefront of the emitted laser pulses and to correct a wavefront of the returned laser pulses and to correct received passive light for the measured aero-optical and aero-thermal effects and atmospheric effects, wherein the one or more optical detectors are configured to sense both the wavefront corrected returned laser pulses and wavefront corrected received passive light to form active and passive images of the target.

14. An optical sensor for a supersonic flight vehicle in which an optical window to the sensor undergoes aero-optical and aero-thermal effects in flight, said optical-sensor comprising:

a pulsed laser that emits laser pulses through the optical window with timing codes;

a wavefront sensor referenced to a clock to detect returning laser pulses that lie within a first time delay window to measure the aero-optical and aero-thermal effects on or just in front of the optical window and to exclude atmospheric effects beyond the optical window;

an optical detector;

an optical path that couples light received through the optical window onto the optical detector;

a Micro-Electro-Mechanical System (MEMS) Micro-Mirror Array (MMA) positioned in the optical path, said MMA comprising a plurality of mirrors independently responsive to command signals to tip and tilt about first and second axes, respectively, and to piston in translation along a third axis in three degrees-of-freedom (3DOF) to correct a wavefront of the received light for the aero-optical and aero-thermal effects measured by the optical detector.

15. The optical sensor of claim 14, wherein the range of translation along the third axis for piston is greater than 1 wavelength at a center wavelength of received light.

16. The optical sensor of claim 14, wherein the mirrors tip and tilt to control a local slope to reduce aberrations.

17. The optical sensor of claim 14, wherein command signals for the MEMS MMA may be provided by (a) a look-up table (LUT) indexed by speed of the supersonic flight vehicle or (b) a continuous wave (CW) or pulsed laser with a wavefront sensor which may or may not be integrated into the optical path to the optical detector and which may be on or off the flight vehicle.

18. The optical sensor of claim 15, wherein the wavefront sensor detects returning laser pulses that lie within a second time delay window to measure atmospheric effects beyond the optical window, said second time delay window having a longer time duration than said first time delay window corresponding to longer round-trip times for the laser pulses, wherein said deformable mirror is responsive to command signals to piston orthogonal to the plane of the mirror to correct the wavefront of received light for the measured atmospheric effects.

* * * * *